United States Patent [19]

von Gunten et al.

[11] Patent Number: 5,274,661
[45] Date of Patent: Dec. 28, 1993

[54] THIN FILM DIELECTRIC COATING FOR LASER RESONATOR

[75] Inventors: Marcus von Gunten, Los Altos; Donald Curry, Sunnyvale; Jasbir Rajasansi; Hakchu Lee, both of San Jose, all of Calif.

[73] Assignee: Spectra Physics Lasers, Inc., Mountain View, Calif.

[21] Appl. No.: 987,360

[22] Filed: Dec. 7, 1992

[51] Int. Cl.$^5$ .............................................. H01S 3/08
[52] U.S. Cl. ...................................... 372/99; 372/98; 359/580; 359/589
[58] Field of Search ............... 372/61, 65, 98, 108, 372/99; 359/580, 589

[56] References Cited

U.S. PATENT DOCUMENTS

| | | | |
|---|---|---|---|
| 4,099,840 | 7/1978 | Van der Wal et al. | 372/99 |
| 4,132,959 | 1/1979 | Bounhuis et al. | 372/99 |
| 4,147,409 | 4/1979 | Apfel | 372/99 |
| 4,201,954 | 5/1980 | Van der Wal et al. | 372/99 |
| 4,615,033 | 9/1986 | Nakano et al. | 372/99 |
| 4,615,034 | 9/1986 | von Gunten et al. | 372/99 |
| 4,856,019 | 8/1989 | Miyata | 372/99 |
| 4,893,314 | 1/1990 | Shull et al. | 372/107 |

*Primary Examiner*—Leon Scott, Jr.
*Attorney, Agent, or Firm*—Fliesler, Dubb, Meyer & Lovejoy

[57] ABSTRACT

A thin film coating deposited on a substrate, the substrate having a first surface and a second surface opposite the first surface. The coating comprises a first dielectric layer, on the first surface of the substrate, having an index of refraction $n_1$ and having an optical thickness of about d; a second dielectric layer, on the first dielectric layer, having an index of refraction $n_2$ and having an optical thickness of about d; and a third dielectric layer, on the second dielectric layer, having an index of refraction of $n_1$ and having an optical thickness of about 2d. The coaing is substantially reflective over at least two regions of wavelengths, each region separated by a region of high transmissiveness. In one aspect, the first dielectric layer is silicon dioxide, the second dielectric layer is titanium dioxide, and the third dielectric layer is silicon dioxide. In a further aspect, an optical element is provided, the optical element having a first series of thin film dielectric layers, the series including alternating layers of a first and second dielectric material, the first dielectric material having an index of refraction of $n_1$ and the second dielectric material having an index of refraction of $n_2$, each layer in the series having an optical thickness of at least d, at least one layer of the second dielectric material having an optical thickness of 2d; and a second series of thin film dielectric layers overlying the first series, the second series including alternating layers of the second dielectric material and a third dielectric material, the third dielectric material having an index or refraction of $n_3$, each layer in the second series having an optical thickness of at least d, at least one layer of the second dielectric material having an optical thickness of 2d.

26 Claims, 4 Drawing Sheets

THIN FILM DIELECTRIC COATING FOR LASER RESONATOR

BACKGROUND OF THE INVENTION

1. Field of the Invention

The invention relates to thin film dielectric coated optics for use in a resonant cavity of a laser.

2. Description of the Related Art

The conventional laser resonating cavity includes a series to two reflecting optical elements placed at either end of a laser tube. In general, the optical elements are coupled to the laser tube in an external manner; that is, the mirrors are mounted to the ends of the tube, with a glass frit, or solder glass joining the reflective portion of the element directly to the end of the laser tube. During the glass frit process, temperatures can reach up to 485° C. U.S. Pat. No. 4,893,314, inventors Shull, et al., assigned to Spectra-Physics, Inc., shows a mounting alternative wherein the laser optics are placed on an internal mount. A mirror seat is inserted into the interior of the laser bore and the optical element is mounted on the mirror seat with the reflective portion of the element on the opposite side of the mounting area.

Optical elements for a laser resonator may be manufactured by coating a substrate, such as glass, with a series of dielectric films to develop the desired reflectance/transmittance of the mirror, depending on whether the mirror is to be used as a high reflectance mirror or as an output coupler. As is well known, such coatings are generally comprised of a plurality of layers of dielectric material, the layers in a reflective stack alternating between materials with high and low indices of refraction with each layer being typically about $\lambda/4$ in optical thickness, thereby defining a reflective surface. The number, index of refraction, and optical thickness of the layers is determined by the desired reflectivity or transmittance of the optical element.

In ion lasers where a "white light" output is desired, operation over a broad range of wavelengths—the red, green and blue visible regions of the spectrum—is required. Three coatings, fabricated using thin film techniques, require a large number of layers for proper operation over broad wavelength ranges due to the particular materials which must be used to make the layers. Normally, the number of layers is limited to 25-40 layers because the materials which may be used to fabricate the coatings must withstand a high temperature frit process to couple the optic element to the laser tube. In general, the thicker the stack of films, the greater the potential for craze.

It is well known that it is possible to select particular transmission bandwidths in, for example, bandpass filters, by varying the structure of the layers deposited on the optical substrate. One such technique involves using absentee layers comprised of contiguous layers of low index materials, having an optical thickness which is approximately twice that of the other layers in the stack. The use of absentee layers provides higher absorption in particular spectral regions. In general, such absentee layers provide for narrow, triangular transmission and absorption spikes on the spectral curve (spikes occur at the same wavelength), and are widely utilized in the manufacture of narrow bandpass filters as it is possible to block all but one transmission peak using absorbing filter or varying the structure. In a quarter wave ($\lambda/4$) stack, the absentee layer has a one-half wavelength optical thickness ($\lambda/2$), placed at the center of the quarterwave stack, which has no effect on the reflectance of the particular wavelength under consideration (assuming zero absorption loss). In such narrow bandpass filters, the objective is to render the transmission spike extremely narrow and with an extremely high transmittance. However, in such designs the potential for unwanted absorption spikes in the filter bandwidth must be continually avoided.

Use of such absentee layers thus provides a technique for the selection of certain regions of operation of the optical element over which the characteristics of the element can be closely controlled.

Other coating designs have incorporated multiple wavelength quarterwave stacks to create white light laser resonators. In a white light laser, the optics must have high transmission in three spectral regions, at 786-622 nm (red), 577-492 nm (green), and 492-455 nm (blue). In such designs, the optical thickness of each layer may vary to create two or more "stop bands," or regions of the wavelength spectrum in which the optic is substantially reflective, separated by regions where the optic is substantially transmissive.

Other problems faced by optical coatings result from intra-cavity effects. Exposure to ultraviolet radiation and vacuum pressures causes deterioration of the coating material. Coating materials which can withstand such effects, such as hafnium dioxide ($HfO_2$), have relatively low indices of refraction compared to commonly used metal oxide films such as $TiO_2$ and $Ta_2O_5$ and a large number of layers are required to fabricate broad bandwidth coatings.

A further problem faced by all coatings is spectral shift during the final sealing of the laser tube. Generally, all dielectric coatings are subject to shift as water molecules are present in the somewhat porous dielectric coatings. A low temperature sealing bake of the assembled tube is performed to outgas foreign materials which may have entered the tube during manufacture. When exposed to the vacuum and final bake, the water molecules exit the coating. Because water has a higher density than air, the operating range of the coating will shift approximately 1-2% shorter. Thus, coatings are generally designed to be manufactured to operate in the spectral region at approximately 1-2% longer wavelengths than desired so that after baking, the coating operates in the desired region.

It is thus desirable to provide a novel optical coating having reflectivity over a broad bandwidth which may be selectively tuned to the particular bandwidth for operation of the laser.

SUMMARY OF THE INVENTION

Thus, there is provided a novel substantially reflective thin film coating structure for use in an ion laser. The coating utilizes at least one absentee layer to form a high reflectance optical element with at least two "stopbands", or regions of wavelengths in which the optic is substantially reflective separated by a region in which the optic is substantially transmissive. Absorption and scattering is reduced over the stopbands by providing for uniform treatment of losses at desired wavelengths. In accordance with one aspect, the number of absentee layers and their location in the sequence of thin film layers of the coating determines the separation and bandwidth of the stopbands. In one aspect the coating is deposited on a substrate, the substrate having a first surface and a second surface opposite the first surface.

In one aspect the coating structure comprises: a first dielectric layer, on the first surface of the substrate, having an index of refraction $n_1$ and having an optical thickness d; a second dielectric layer, on the first dielectric layer, having an index of refraction $n_2$ and having an optical thickness d; and a third dielectric layer, on the second dielectric layer, having an index of refraction of $n_1$ and having an optical thickness of 2d. The structure provides an optical element wherein the coating is substantially reflective over at least two bandwidths when the above-described design structure is repeated a given number of times (see Table 1), so that it may be used as a reflective optical element such as an output coupler or a high reflector mirror in a laser resonator.

In another aspect, the first dielectric layer is silicon dioxide, the second dielectric layer is titanium dioxide, and the third dielectric layer is silicon dioxide. In another aspect the coating further includes a fourth dielectric layer, on the third dielectric layer, having an index of refraction of $n_3$. The fourth dielectric layer may be comprised of hafnium dioxide. In this aspect, the coating utilizes a hybrid structure, allowing a hard material, such as hafnium dioxide, to overlay the titanium dioxide. Use of the higher index titanium allows for a reduction in coating thickness, while the hafnium cap layer reduces intracavity effects on the coating.

In another aspect, a unique laser resonator is provided. The resonator includes a laser tube having a first and second ends. In addition, a first and a second substrate, each having a first surface and a second surface opposite the first surface, and consisting of an essentially transparent material, are positioned at the first and second ends of the laser tube, respectively. A first series of thin film dielectric layers is provided on each of the first and second substrates. The first series including alternating layers of a first and second dielectric material, the first dielectric material having an index of refraction of $n_1$ and the second dielectric material having an index of refraction of $n_2$, each layer in the first series having an optical thickness of at least d, at least one layer of the second dielectric material having an optical thickness of about 2d. In addition, a second series of thin film dielectric layers overlies the first series. The second series includes alternating layers of the second dielectric material and a third dielectric material, the third dielectric material having an index of refraction of $n_3$. Each layer in the second series has an optical thickness of at least d, at least one layer of the second dielectric material having an optical thickness of about 2d.

BRIEF DESCRIPTION OF THE DRAWINGS

The invention will be described with respect to the particular embodiments thereof. Other objects, features, and advantages of the invention will become apparent with reference to the specification and drawings in which.

DESCRIPTION OF THE PREFERRED EMBODIMENT

Figure 1:
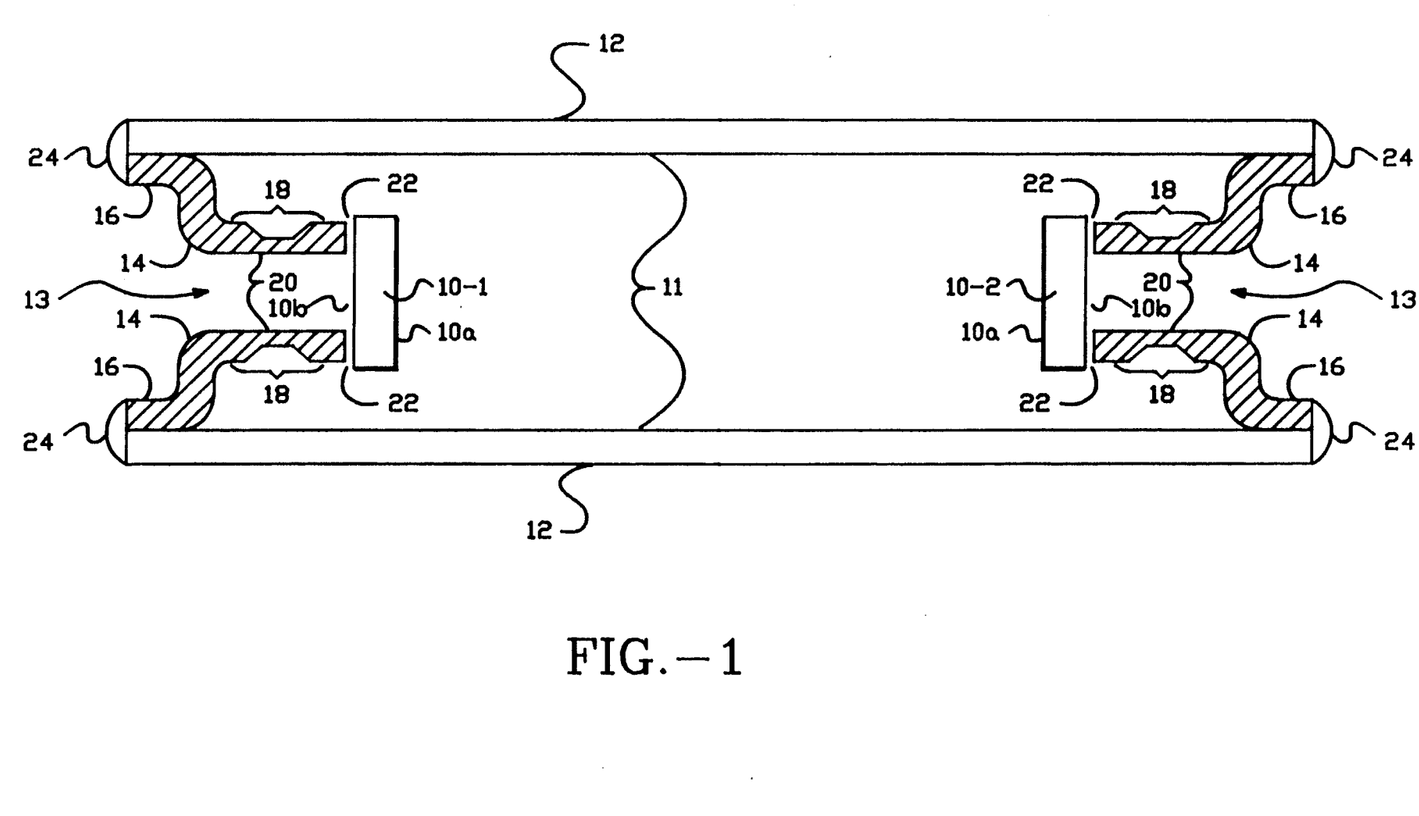
FIG. 1 is a cross-section of an exemplary laser resonator formed in accordance with the method of the present invention.

FIG. 1 shows an internal mirror, ion laser resonant cavity utilizing a mirror mount described in U.S. Pat. No. 4,893,314 (hereafter the '314 patent). As will be discussed below, the unique mounting structure of the optical elements in the resonant cavity makes possible a novel method of manufacture for the resonant cavity providing specific advantages with respect to deposition of the dielectric coatings onto the substrate and the materials which may be used in the coating. More particularly, the mounting structure shown in the '314 patent allows for the use of a manufacturing process wherein the laser resonator is fabricated without exposing the thin film dielectric coatings to the high temperature frit process normally required to mount the substrate to the resonator tube.

FIG. 1 shows a laser tube 11 having walls 12, a mirror seat 14, and mirror 10. Substrate seat 14 has a first length 16, which has an outside diameter closely matched to the inside diameter of the laser tube defined by walls 12. Second length 18 of substrate seat 14 has an outside diameter smaller than the inside diameter of the tube formed by walls 12. A passage 13 is provided in second length 18 of substrate seat 14 for the laser output. As specified in the '314 patent, the optical element 10 may be attached to the end of second length portion 18 by a glass frit, solder glass, or other known methods. Seat 14 may be attached to the ends of tube walls 12 by a fusion weld, such as a heliarc or TIG weld, to form a vacuum seal. Weld beads 24 are shown at the end of tube 12 and mirror seat 14.

Conventionally, dielectric coatings are applied to the optical substrates prior to securing the coated substrate to the laser tube. In accordance with the method of the invention, the optical substrate is glass fritted to the substrate seat 14 prior to the deposition of dielectric thin film coatings thereon. Thereafter, the optical substrate may be subjected to dielectric coating deposition, with the coatings applied to one side 10a of the optical substrate which is opposite side 10b of the substrate attached to mirror mount. Finally, seat 14, with coated optical substrate 10 attached thereto, may be welded to tube body 12. Tube 12 is thereafter evacuated and passed to a vacuum after passing through an outgassing process at temperatures of approximately 200°–250° Celsius.

In manufacturing the assembled laser tube shown in FIG. 1, a first substrate 10-1 may be provided into one end of the laser tube 12 and a second substrate 10-2 is provided into the opposite end of laser tube 12.

Generally, substrates 10-1 and 10-2 are fabricated to comprise a high reflector mirror and an output coupler. In accordance with the method of the present invention, side 10b of substrate 10-1 is attached to one substrate seat 14. Thereafter, side 10a of substrate 10-1 is coated with alternating layers of high and low index materials to form a coating which has a high reflectance. Seat 14, with coated substrate 10-1 attached thereto, is then coupled to one end of tube body 12, generally by welding seat 14 thereto. To form an output coupler, side 10b of substrate 10-2 is first coated with an antireflective coating. Side 10b of substrate 10-2 is thereafter attached to a substrate seat 14, and side 10a of substrate 10-2 is coated with alternating layers of high and low index materials to form a coating which is highly reflective, and partially transmissive. Seat 14 with coated substrate 10-2 attached thereto, is then coupled to one end of tube body 12, generally by welding seat 14 thereto.

It should be understood that processing of the substrates, 10-1, 10-2 may occur simultaneously, and each substrate/substrate seat assembly installed in the tube after the particular coatings have been applied thereto.

The tube structure shown in FIG. 1, and particularly the method described above for manufacturing tube 11, provides unique advantages in the manufacture of broad band or multiband lasers. Since the dielectric thin film coatings applied to the substrates used to form optic elements 10 are not exposed to high temperature frit processing, different materials, having higher indices of refraction and thermal coefficients not normally conducive to use with the conventional, direct tube mounted mirror resonators, may be utilized in the formation of the coatings. Further, the potential for craze of the dielectric coatings is significantly reduced, since the coatings are exposed only to the 200°–250° C. tube outgassing process. The use of materials with a higher index of refraction increases the ratio between the respective layers of high and low index material to allow for increased reflectance with a reduction in coating thicknesses through a reduction in the number of layers necessary to obtain the desired reflectivity over a wide bandwidth structure. In addition, other high index materials which are less susceptible to the deleterious effects of intracavity conditions, can be used in the resonant cavity. This has allowed for the development of a coating structure suitable for use as either a high reflectance mirror or an output coupler, wherein at least two discrete bandwidths with high absorption and transmission in certain spectral regions may be provided from a minimum number of dielectric layers.

The coating design of the present invention is advantageous in the manufacture of a "white light" laser, wherein the desired wavelengths include the red, green and blue regions of the spectrum, generally classified into the bandwidths: red 780–622 (nm); green 577–492 (nm); and blue 492–455 (nm).

The coating structure of the present invention applies the principles of thin film technology and the use of absentee layers to a laser resonator. The coating structure of the present invention allows for reduced absorption and scattering through all spectral regions of interest by providing for uniform treatment of losses at desired wavelengths through the use of at least one absentee layer to simultaneously produce two stopbands. In this context, the term stopband refers to a regions of wavelength in which the optic is substantially reflective separated by a region in which the optic is substantially transmissive. The number of absentee layers, and their location in the design stack, will determine the separation and the bandwidths of the stopbands, as well as the number of stopbands. In one embodiment, at least one absentee layer may be utilized to form at least two stopbands. In an alternative embodiment multiple absentee layers may be utilized to form two or more stopbands.

Table 1 shows one embodiment of the structure for fabricating an output coupler for use in one embodiment of the instant invention. For each layer 1-21, the index of refraction (n), the dielectric constant (k) and the optical thickness, in nanometers, are shown.

TABLE 1

| Layer No. | Material | n | k | Optical Thickness (NM) |
|---|---|---|---|---|
| 0 | BK7 | 1.4595 | 0.0000E + 00 | Massive |
| 1 | TiO$_2$ | 2.3129 | −0.2692E − 04 | 508.16 |
| 2 | SiO$_2$ | 1.4450 | 0.0000E + 00 | 537.72 |
| 3 | TiO$_2$ | 2.3129 | −0.2692E − 04 | 747.47 |
| 4 | SiO$_2$ | 1.4450 | 0.0000E + 00 | 732.89 |
| 5 | TiO$_2$ | 2.3129 | −0.2692E − 04 | 540.75 |
| 6 | SiO$_2$ | 1.4450 | 0.0000E + 00 | 543.12 |
| 7 | TiO$_2$ | 2.3129 | −0.2692E − 04 | 521.71 |
| 8 | SiO$_2$ | 1.4450 | 0.0000E + 00 | 1190.42 |
| 9 | TiO$_2$ | 2.3129 | −0.2692E − 04 | 501.10 |
| 10 | SiO$_2$ | 1.4450 | 0.0000E + 00 | 539.74 |
| 11 | TiO$_2$ | 2.3129 | −0.2692E − 04 | 522.95 |
| 12 | SiO$_2$ | 1.4450 | 0.0000E + 00 | 551.79 |
| 13 | TiO$_2$ | 2.3129 | −0.2692E − 04 | 518.78 |
| 14 | SiO$_2$ | 1.4450 | 0.0000E + 00 | 542.05 |
| 15 | HfO$_2$ | 2.3129 | −0.3367E − 05 | 515.99 |
| 16 | SiO$_2$ | 1.4450 | 0.0000E + 00 | 1206.03 |
| 17 | HfO$_2$ | 2.3129 | −0.3367E − 05 | 522.72 |
| 18 | SiO$_2$ | 1.4450 | 0.0000E + 00 | 534.89 |
| 19 | HfO$_2$ | 2.3129 | −0.3367E − 05 | 528.20 |
| 20 | SiO$_2$ | 1.4450 | 0.0000E + 00 | 542.27 |
| 21 | HfO$_2$ | 2.3129 | −0.3367E − 05 | 519.02 |
| 22 | VACUUM | 1.0000 | 0.0000E + 00 | Massive |

As shown therein, approximately twenty-one (21) layers of material comprising titanium dioxide (TiO$_2$), silicon dioxide (SiO$_2$), and hafnium dioxide (HfO$_2$) are deposited onto a glass substrate, such as Schott BK-7, to form an output coupler having two transmissive bands over particular regions of interest. The coating shown in Table 1 is specifically designed for use with a "white light" laser wherein the particular bands of interest comprise the red/green/blue regions of the visible light spectrum.

Table 1 defines the coating as comprising approximately fourteen (14) stratified layers of titanium dioxide and silicon dioxide, seven (7) layers each. Overlying the final layer of silicon dioxide in the first fourteen (14) layer section of the coating, is a layer of hafnium dioxide. This layer begins a sequence of approximately seven (7) layers of alternating hafnium dioxide/silicon dioxide structure, four (4) layers of hafnium, three (3) of silicon dioxide. Titanium dioxide and hafnium dioxide materials have indices of refraction, 2.31 and 2.01, respectively at about 500 nm. The silicon dioxide is a low index material, having an index of refraction of 1.44 at about 500 nm. As will be further noted, the respective optical thicknesses, in nanometers, of each layer of the coating is approximately equal, with the exception of layer numbers 8 and 16. The optical thickness ranges from 501 nm (layer number 9) to a maximum of 747.47 nm, for all layers but layers 8 and 16. The mean optical thickness of all layers, excluding layers 8 and 16, is 551.05 nanometers. Layers 8 and 16, both silicon dioxide layers, have optical thicknesses of 1190.42 nanometers and 1206.03 nanometers, respectively, approximately twice that of the mean thickness of all the other layers in the design stack. These nested contiguous stacks of half-wave layers define the particular stopbands of interest in the output coupler, as shown in FIG. 2.

As will be generally understood by those skilled in the art, the index structure of the coating specified in Table 1, generally takes the form: (Substrate) (HL)³ H2L (HL)³ H2L (HL)² H (Vacuum), where: H=a quarter-wavelength high index material, L=a quarter-wavelength low index material, and superscripted numbers indicate the number of times the sequences within the parenthesis are repeated, e.g., (HL)³=HLHLHL. More particularly, the structure may be expressed as (Substrate) (HL)³H2L(HL)³M2L(ML)³M(Vacuum), where M is an intermediate index material having a resistance to intra cavity effects which is superior to H. In one embodiment H=TiO₂, M=HfO₂, and L=SiO₂.

Figure 2:
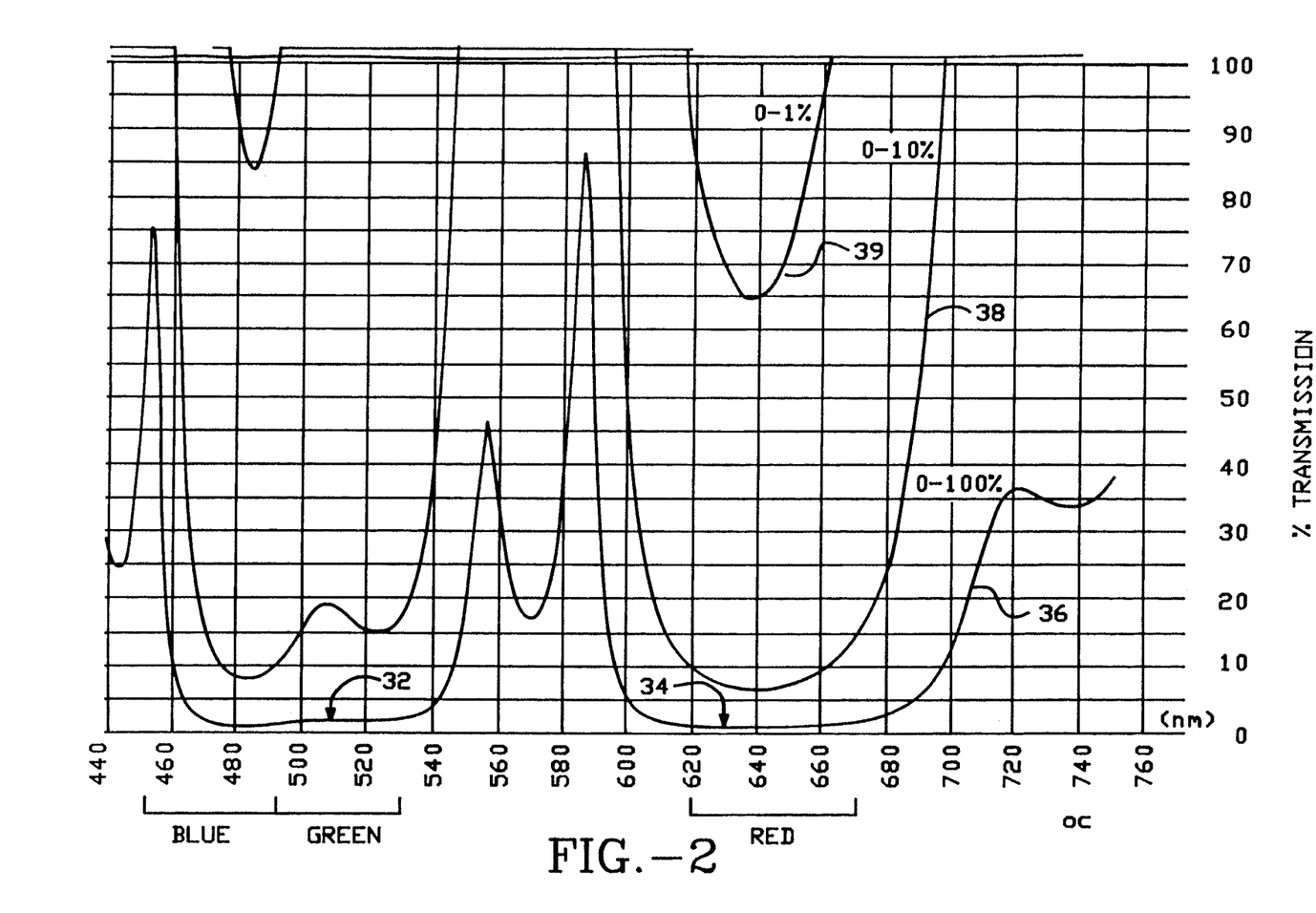
FIG. 2 is a graph of the transmittance versus wavelength for an output coupler fabricated in accordance with the novel coating structure set forth in the specification.
Figures 2A, 3A:
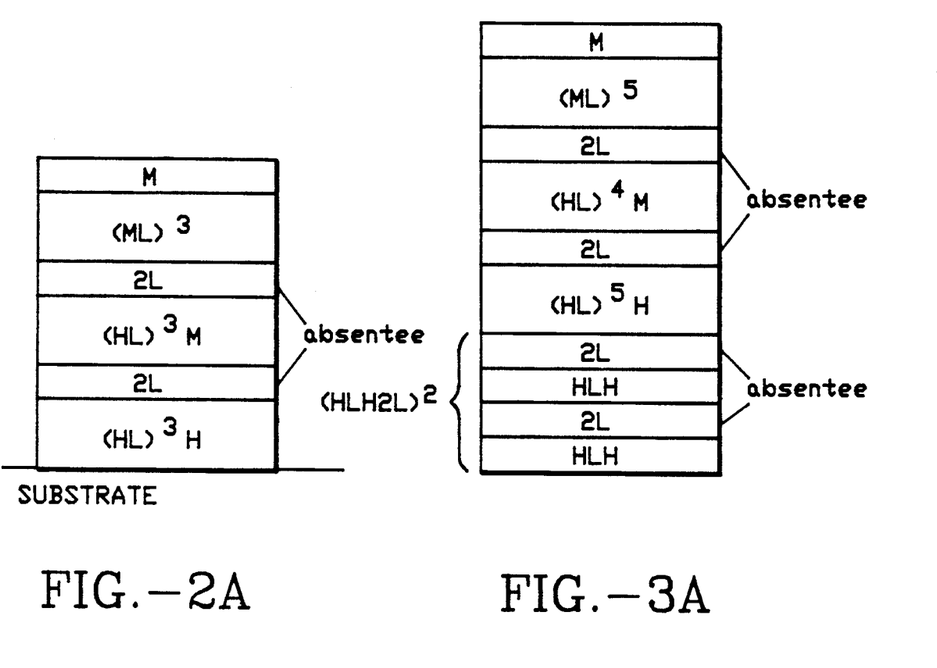
FIG. 2A is a block representation of the coating stack structure of the present invention for an output coupler disposed on a substrate.
FIG. 3A is a block representation of the coating stack structure of the present invention for a high reflectance element disposed on a substrate.

FIG. 2 shows the characteristics of the structure defined in Table 1. FIG. 2 graphically depicts the percentage of transmission for the coating defined in Table 1 from a Tungsten light source impinging the coating at an angle of incidence of 0° at room temperature. In FIG. 2, the abscissa represents the percentage of transmission of radiation, in the form of visible light, through the optical structure defined in Table 1. The ordinate represents the wavelength of the radiation incident on the optical element. Three scales of indicia are shown in FIG. 2. Indicia 36 is a full scale representation ranging from 0 to 100 percent transmission through the optical element. Indicia 38 is a 0 to 10 percent scale and indicia 39 is a 0 to 1 percent scale, further resolving the transmission peaks of radiation through the optical element.

Two stopbands are shown at indicia 32 and 34. A first stopband region extends between approximately 460 nm to 530 nm, and a second stopband region extends from approximately 595 nm to 670 nm. As shown by indicia 39, the output coupler defined in Table 1 has transmission values of approximately 0.85 and 0.65%) at peaks between 482-485 nm and 635-640 nm. With reflectivity R equal to $1-T$ (assuming negligible scatter and absorption losses), the output coupler is highly reflective and partially transmissive over bandwidths in the red (620 nm-~670), green (495 nm-~530) and blue (455 nm-~495) spectral regions, with non-transmissive peaks (at 482-485 and 635-640 nm) separating the stopband regions. When used in a ion laser tube, in conjunction with an appropriate excitation medium, such as krypton and argon, and a high reflector as discussed below, a novel resonant cavity which produces an output over the red, green and blue regions of the spectrum is provided.

Table 2 shows a structure for fabricating a high reflectance optical element for use in conjunction with the output coupler defined in Table 1. Again, for each layer 1-36, the index of refraction (n), the dielectric constant (k), and the optical thickness, in nanometers, is shown.

TABLE 2

| Layer No. | Material | n | k | Optical Thickness (nm) |
|---|---|---|---|---|
| 0 | BK7 | 1.5176 | 0.0000E + 00 | Massive |
| 1 | TiO₂ | 2.3129 | −0.2692E − 04 | 593.20 |
| 2 | SiO₂ | 1.4450 | 0.0000E + 00 | 606.36 |
| 3 | TiO₂ | 2.3129 | −0.2692E − 04 | 660.74 |
| 4 | SiO₂ | 1.4450 | 0.0000E + 00 | 1043.78 |
| 5 | TiO₂ | 2.3129 | −0.2692E − 04 | 540.84 |
| 6 | SiO₂ | 1.4450 | 0.0000E + 00 | 578.69 |
| 7 | TiO₂ | 2.3129 | −0.2692E − 04 | 545.03 |
| 8 | SiO₂ | 1.4450 | 0.0000E + 00 | 1150.91 |
| 9 | TiO₂ | 2.3129 | −0.2692E − 04 | 552.52 |
| 10 | SiO₂ | 1.4450 | 0.0000E + 00 | 566.91 |
| 11 | TiO₂ | 2.3129 | −0.2692E − 04 | 565.53 |
| 12 | SiO₂ | 1.4450 | 0.0000E + 00 | 546.84 |
| 13 | TiO₂ | 2.3129 | −0.2692E − 04 | 508.53 |
| 14 | SiO₂ | 1.4450 | 0.0000E + 00 | 1193.68 |
| 15 | TiO₂ | 2.3129 | −0.2692E − 04 | 470.87 |
| 16 | SiO₂ | 1.4450 | 0.0000E + 00 | 543.36 |
| 17 | TiO₂ | 2.3129 | −0.2692E − 04 | 555.20 |
| 18 | SiO₂ | 1.4450 | 0.0000E + 00 | 562.84 |
| 19 | TiO₂ | 2.3129 | −0.2692E − 04 | 553.77 |
| 20 | SiO₂ | 1.4450 | 0.0000E + 00 | 565.80 |
| 21 | TiO₂ | 2.3129 | −0.2692E − 04 | 568.67 |
| 22 | SiO₂ | 1.4450 | 0.0000E + 00 | 588.40 |
| 23 | HfO₂ | 2.0193 | −0.3367E − 05 | 454.33 |
| 24 | SiO₂ | 1.4450 | 0.0000E + 00 | 1141.15 |
| 25 | HfO₂ | 2.0193 | −0.3367E − 05 | 495.14 |
| 26 | SiO₂ | 1.4450 | 0.0000E + 00 | 560.62 |
| 27 | HfO₂ | 2.0193 | −0.3367E − 05 | 548.98 |
| 28 | SiO₂ | 1.4450 | 0.0000E + 00 | 561.60 |
| 29 | HfO₂ | 2.0193 | −0.3367E − 05 | 551.07 |
| 30 | SiO₂ | 1.4450 | 0.0000E + 00 | 544.24 |
| 31 | HfO₂ | 2.0193 | −0.3367E − 05 | 551.82 |
| 32 | SiO₂ | 1.4450 | 0.0000E + 00 | 468.71 |
| 33 | HfO₂ | 2.0193 | −0.3367E − 05 | 515.86 |
| 34 | SiO₂ | 1.4450 | 0.0000E + 00 | 417.03 |
| 35 | HfO₂ | 2.0193 | −0.3367E − 05 | 320.03 |
| 36 | VACUUM | 1.0000 | 0.0000E + 00 | Massive |

As shown in Table 2, a high reflectance coating in accordance with the present invention comprises thirty-five (35) layers of dielectric material disposed on a BK-7 glass substrate. The first twenty-two (22) layers overlying the substrate are comprised of alternating layers of titanium dioxide and silicon dioxide, eleven (11) layers each. Thirteen (13) layers of hafnium dioxide and silicon dioxide overlie the twenty-two (22) layers of titanium dioxide and silicon dioxide. Approximately seven (7) layers of hafnium and six (6) layers of silicon dioxide are provided. Layers 4, 8, 14, and 24 have optical thicknesses of 1043.78 nanometers, 1150.91 nanometers, 1193.68 nanometers and 1141.15 nanometers, respectively. Again, the optical thickness of these layers is approximately twice that of the mean optical thickness (490.53 nanometers) of all other layers in the stack, excluding layers 4, 8, 14 and 24.

In general, the index structure of the coating shown in Table 2 takes the form: (Substrate) (HLH2L)² (HL)⁵ H2L(HL)⁴ H2L(HL)⁵H (Vacuum). More particularly, the structure may be expressed as (Substrate) (HLH2L)² (HL)⁵ H2L(HL)⁴M2L(ML)⁵M (Vacuum) where H, L and M have the same definitions as noted above.

Figure 3:
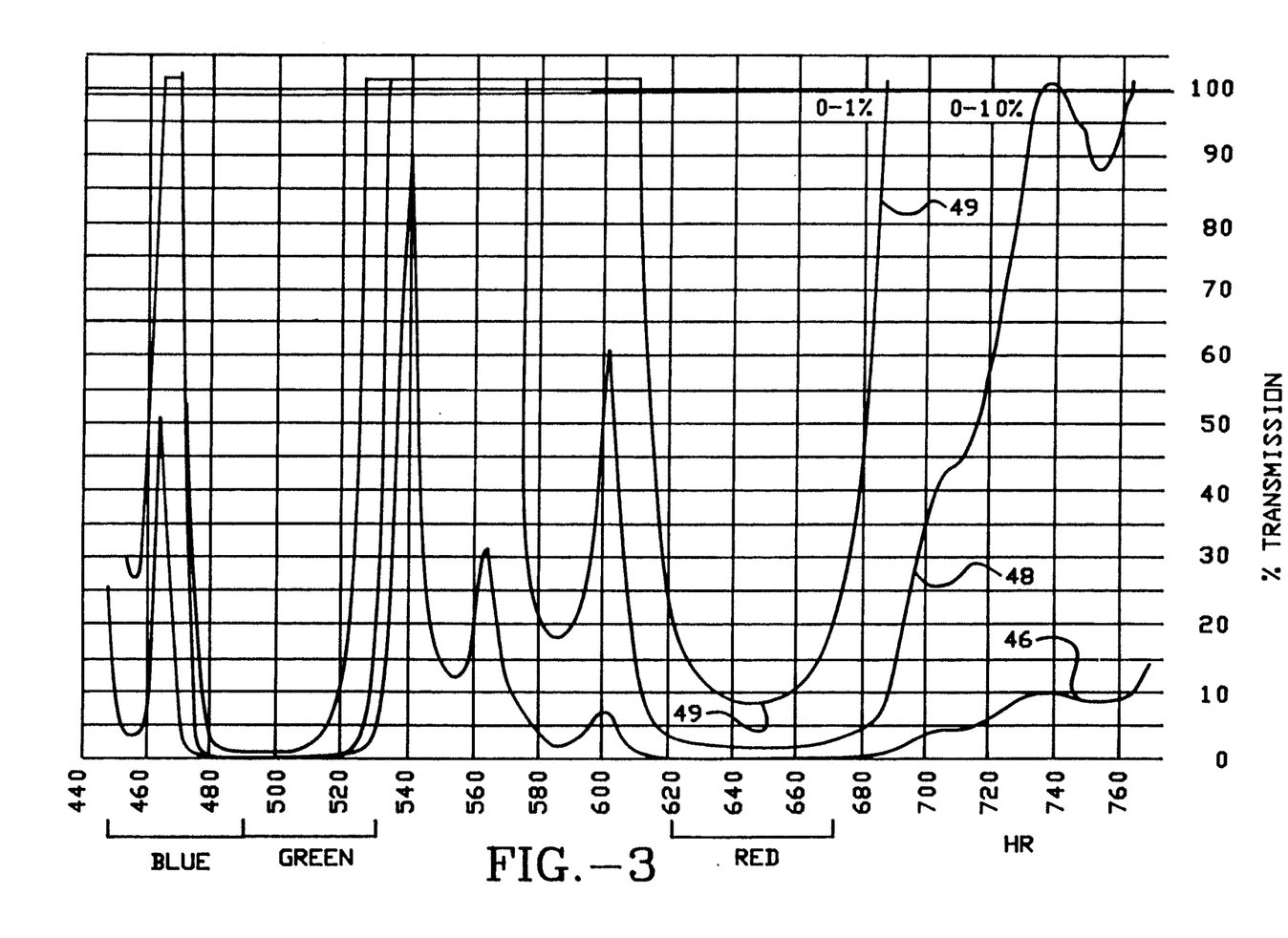
FIG. 3 is a graph of the transmittance versus wavelength for a high reflectance mirror fabricated in accordance with the novel coating structure set forth in the specification.
Figure 4:
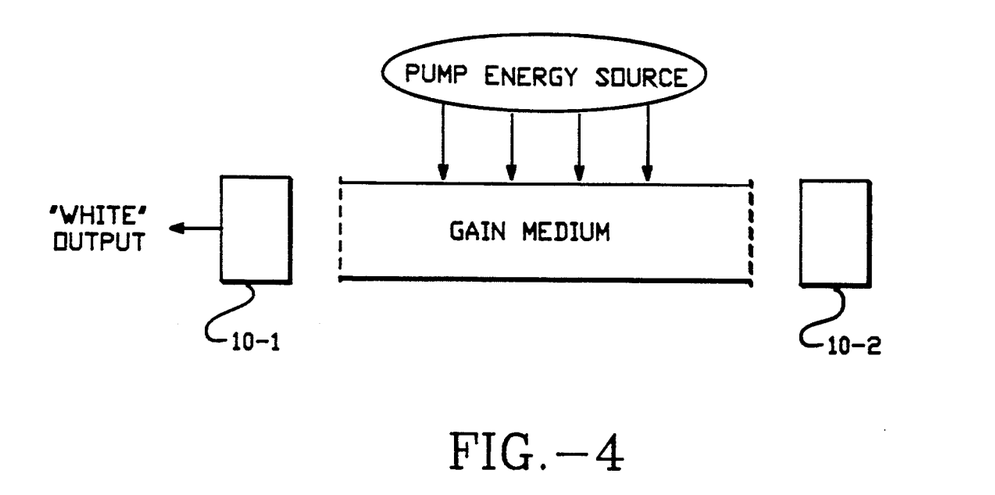
FIG. 4 is a block diagram of a laser formed using the high reflector and output coupler in accordance with the present invention.

FIG. 3 shows the characteristics of the coating structure defined in Table 2. Again, the percentage of transmission resulting from a tungsten light source impinging on the optical element at a 0° angle of incidence at room temperature is depicted. The ordinate represents the percent transmission with respect to the particular scale in use (indicia 46=100%; indicia 48=10%; and indicia 49=1%) and the abscissa represents the wavelength incident on the optical element. As shown therein, over the range of approximately 465 nm to 525 nm, the coating is nearly 100 percent reflective, i.e., 0.01 percent transmissive, as is clarified by indicia 49. A second band of high reflectance (approximately 99.9 percent) is present over the range of approximately 620 nanometers to 670 nanometers.

Thus, when the coatings defined in Table 1 and Table 2 are used, respectively, on substrates 10-1 and 10-2 in the optical resonator shown in FIG. 1, with an active medium such as argon or argon-krypton gas, a lasing environment will be developed between the mirrors at the particular wavelengths in the stopband regions of the elements. The output coupler will allow selective transmittance of the visible spectrum defined over the red/green/blue spectral bands shown in FIGS. 2 and 3 as resonance over the selected frequencies develops. As noted above, the method of manufacture of the laser described above allows use of the high index material of titanium dioxide in the coating structure.

One novel characteristic of the coating structures of the present invention to the fact that the design of both the output coupler and high reflector utilizes a single wavelength stack coating structure in creating three stopband regions. Each quarterwave layer is approximately equal in optical thickness, being approximately one quarter wavelength elements at a single wavelength. In past designs, multiple wavelength stacks were used to create the three stopbands necessary for white light resonator optics.

It is particularly noteworthy that the coating structures shown in Tables 1 and 2 have a hybrid structure. That is, two different high index materials, in conjunction with the $SiO_2$ spacer layers, are utilized. This hybrid structure presents distinct advantages. First, hafnium dioxide, though having an intermediate index of refraction, tends to craze under the frit temperatures normally utilized with lasers incorporating mirrors sealed directly to the tube structure. However, hafnium dioxide is a much more durable and has lower radiant absorption characteristics than titanium dioxide and, as a result, by placing the hafnium layers adjacent to the internal laser excitation region, the optical elements do not deteriorate as rapidly as they would if manufactured from other compounds, minimizing material deterioration and extending both the life and stability of the laser. Further, by using the higher index titanium dioxide as the innermost layers, a reduction in the number of layers in the coating structure can be achieved with no sacrifice in the amount of reflectance which results from the stack. The use of an entirely hafnia structure and the design of the output coupler would result in a structure having approximately 38 layers or more.

Furthermore, the structures defined in Tables 1 and 2 provide reduced absorption and scattering through the spectral regions of interest by providing for a uniform treatment of losses at desired wavelengths through use of the absentee layers to simultaneously produce two stopbands. As should be readily understood, the number of absentee layers in the design stack and their location, as well as stack repetition and material indices therein, will determine the positions of the stopbands and the bandwidth thereof. This allows the coating design to be optimized to create resonance in particular spectral regions. In addition, alternative high index materials such as $Nb_2O_5$, having an index refraction of approximately 2.2, $Ta_2O_5$ having an index refraction of approximately 2.1, $ZrO_2$ having an index refraction of approximately 2.0, and $Al_2O_3$ having an index refraction of approximately 1.7 (all at about 500 nm) may be utilized in the design.

It should be recognized by those skilled in the art that the coating structure designed in accordance with the present invention should be designed to operate at wavelengths 1-2% longer than necessary if the coating is to be subjected to a vacuum bake to outgas the assembled laser tube in order to compensate for spectral shift of the coating.

In yet another embodiment of the invention, this spectral shift can be avoided where the outermost layer in the stack is made of aluminum oxide $Al_2O_3$. It has been discovered that provision of the $Al_2O_3$ layer as, for example, layer 21 in the output coupler example or layer 35 in the high reflectance coating, prevents such spectral shift.

Thus, the laser resonator discussed herein may be advantageously used over two specific bands of visible light. The coating structure and manufacturing method shown in the instant specification can be utilized in a number of different applications, such as ultraviolet argon in the 350 to 360 nanometer wavelength range or the blue-green argon in the 488 to 514 nanometer range. Further, this application could be utilized down to the 275 to 350 wavelength range. It should be understood that the invention disclosed herein with respect to the coating is applicable to any absentee layer providing reflectivity over two different stopbands.

The many features and advantages of the present invention should be obvious to those skilled in the art. Those advantages and features are intended to be within the context of the invention, as defined by the instant specification, the drawings and the attached claims.

What is claimed is:

1. A thin film coating deposited on a substrate, the substrate having a first surface and a second surface opposite the first surface, comprising:
    a first dielectric layer, on the first surface of the substrate, having an index of refraction $n_1$ and having an optical thickness of about d;
    a second dielectric layer, on the first dielectric layer, having an index of refraction $n_2$ and having an optical thickness of about d; and
    a third dielectric layer, on the second dielectric layer, having an index of refraction of $n_1$ and having an optical thickness of about 2d;
    wherein the coating is substantially reflective over at least two regions of wavelengths, each region separated by a region of high transmissiveness.

2. The coating of claim 1 wherein the first dielectric layer is silicon dioxide, the second dielectric layer is titanium dioxide, and the third dielectric layer is silicon dioxide.

3. The coating of claim 1 further including a fourth dielectric layer, on the third dielectric layer, having an index of refraction of $n_3$.

4. The coating structure of claim 3 wherein the fourth dielectric layer is comprised of hafnium dioxide.

5. In a laser, a thin film coating deposited on a substrate, the substrate having a first surface and a second surface opposite the first surface, the coating comprising:
    a multi-layer stack of dielectric layers, wherein the stack includes
        a first plurality of layers, each layer having an index of refraction $n_1$ and an optical thickness of at least d, and
        a second plurality of layers, each layer having an index of refraction of $n_2$, and optical thickness of at least d;
    wherein
        one of the first plurality of layers is disposed on the first side of the substrate, one of the second plurality of layers is disposed on the one of the first plurality of layers,
respective ones of the first plurality of layers overlie respective ones of the second plurality of layers to form a first coating stack, and
at least one of the second plurality of layers has an optical thickness of at least 2d.

6. The coating of claim 5 wherein the first plurality of layers is comprised of titanium dioxide.

7. The coating of claim 6 wherein the second plurality of layers is comprised of silicon dioxide.

8. The coating of claim 5 wherein at least two reflective wavebands are formed, one of said wavebands encompassing the red region of the visible spectrum and one of said wavebands encompassing the green and blue regions of the visible spectrum.

9. The coating of claim 8 wherein the reflective wavebands are about 460 nm–530 nm, and about 595 nm to 670 nm.

10. The coating of claim 5 further including a third plurality of layers, each layer having an index of refraction of n3, and an optical thickness of at least d, wherein one of the third plurality of layers is disposed on the first coating stack, one of the second plurality of layers is disposed on said one of the third plurality of layers, and respective ones of the third plurality of layers overlie respective ones of the second plurality of layers on the first coating stack thereby forming a second coating stack contiguous with the first coating stack.

11. The coating of claim 10 wherein at least two of the second plurality of layers have an optical thickness of about 2d.

12. The coating of claim 11 wherein at least one of the second plurality of layers having an optical thickness of about 2d is disposed in the first coating stack, and at least one of the second plurality of layers having an optical thickness of about 2d is disposed in the second coating stack.

13. The coating of claim 10 wherein at least four of the second plurality of layers have an optical thickness of about 2d, and wherein at least three of the layers are disposed in the first coating stack.

14. The coating of claim 10 wherein the third plurality of layers is comprised of hafnium dioxide.

15. The coating of claim 5 wherein the first plurality of layers comprises titanium dioxide, and the second plurality of layers comprises silicon dioxide.

16. An optical coating having the structural index:

(HL)³H2L(HL)³H2L(HL)²H where
H = a dielectric material having an index of refraction of 1.7 or greater; and
L = a dielectric material having an index of refraction of 1.5 or less.

17. The optical coating of claim 16 wherein the coating comprises (HL)³H2L(HL)³M2L(ML)²M where
M = a dielectric material having an index of refraction of 1.7 or greater and having a higher resistance to intracavity effects than material H.

18. The coating of claim 17 wherein material H comprises titanium dioxide, material L comprises silicon dioxide, and material M comprises hafnium dioxide.

19. An optical coating having the structural index:

(HLH2L)²(HL)⁵H2L(HL)⁴H2L(HL)⁵H where
H = a dielectric material having an index of refraction of 1.7 or greater; and
L = a dielectric material having an index of refraction of 1.5 or less.

20. The optical coating of claim 19, wherein the structure comprises (HLH2L)²(HL)⁵H2L(HL)⁴M2L(ML)⁵M where
M = a dielectric material having an index of refraction of 1.7 or greater and having a higher resistance to intracavity effects than material H.

21. The coating of claim 19 wherein material H comprises titanium dioxide, material L comprises silicon dioxide, and material M comprises hafnium dioxide.

22. A thin-film coating comprising:
a first series of thin film dielectric layers, the series including alternating layers of a first and second dielectric material, the first dielectric material having an index of refraction of $n_1$ and the second dielectric material having an index of refraction of $n_2$, each layer in the series having an optical thickness of at least d, at least one layer of the second dielectric material having an optical thickness of 2d; and
a second series of thin film dielectric layers overlying the first series, the second series including alternating layers of the second dielectric material and a third dielectric material, the third dielectric material having an index of refraction of $n_3$, each layer in the second series having an optical thickness of at least d, at least one layer of the second dielectric material having an optical thickness of 2d.

23. A mirror, comprising:
a substrate, having a first surface and a second surface opposite the first surface, and consisting of an essentially transparent material;
a series of thin film dielectric layers, on the first surface of the substrate, each layer in the series having alternating indices of high and low refraction, each layer having an optical thickness of at least d, wherein the series includes at least one layer having an optical thickness of about 2d such that at least two reflective wavebands are provided.

24. An output coupler, comprising:
a substrate, having a first surface and a second surface opposite the first surface, and consisting of an essentially transparent material;
a series of thin film dielectric layers, on the first surface of the substrate, each layer in the series having alternating an indices of refraction $n_1$ and $n_2$, each layer having an optical thickness of about d, wherein the series includes at least one layer having an optical thickness of 2d such that at least substantially reflective wavebands are formed.

25. A laser resonator, comprising:
a laser tube having a first and second ends;
a first and a second substrate, each having a first surface and a second surface opposite the first surface, and consisting of an essentially transparent material, positioned at the first and second ends of the laser tube, respectively;

a first series of thin film dielectric layers provided on each of the first and second substrates, the first series including alternating layers of a first and second dielectric material, the first dielectric material having an index of refraction of $n_1$ and the second dielectric material having an index of refraction of $n_2$, each layer in the first series having an optical thickness of about d, at least one layer of the second dielectric material having an optical thickness of about 2d; and a second series of thin film dielectric layers overlying the first series, the second series including alternating layers of the second dielectric material and a third dielectric material, the third dielectric material having an index or refraction of $n_3$, each layer in the second series having an optical thickness of about d, at least one layer of the second dielectric material having an optical thickness of about 2d.

26. A method for forming a mirror, comprising:

providing a substrate;

depositing alternating layers of a first and second dielectric material, the first dielectric material having an index of refraction of $n_1$ and the second dielectric material having an index of refraction of $n_2$, each layer deposited to an optical thickness of at least d, wherein at least one layer of the second dielectric material is deposited to an optical thickness of 2d, to form a coating stack;

depositing, over the coating stack, alternating layers of the second dielectric material and a third dielectric material, the third dielectric material having an index or refraction of $n_3$, each layer deposited at an optical thickness of about d, at least one layer of the second dielectric material deposited at an optical thickness of about 2d.

* * * * *